(12) United States Patent
Hatano

(10) Patent No.: US 7,780,246 B2
(45) Date of Patent: Aug. 24, 2010

(54) BRAKE SYSTEM

(75) Inventor: Kunimichi Hatano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 630 days.

(21) Appl. No.: 11/703,593

(22) Filed: Feb. 7, 2007

(65) Prior Publication Data

US 2007/0205659 A1 Sep. 6, 2007

(30) Foreign Application Priority Data

Mar. 2, 2006 (JP) ............................. 2006-056163

(51) Int. Cl.
*B60T 8/34* (2006.01)
(52) U.S. Cl. .................................... 303/155; 303/115.2
(58) Field of Classification Search ................. 303/155, 303/116.2, 115.1, 115.2
See application file for complete search history.

(56) References Cited

U.S. PATENT DOCUMENTS 5,758,930 A * 6/1998 Schiel et al. .............. 303/113.4

2005/0275286 A1 * 12/2005 Ohmori et al. ............... 303/155

FOREIGN PATENT DOCUMENTS

JP 2000-127805 5/2000

* cited by examiner

*Primary Examiner*—Bradley T King
(74) *Attorney, Agent, or Firm*—Carrier, Blackman & Associates P.C.; William D. Blackman; Joseph P. Carrier

(57) ABSTRACT

In a BBW type brake system, first ports of fluid pressure generators are closed to generate brake fluid pressure in respective wheel cylinders before a master cylinder generates brake fluid pressure, by initiating the operation of the fluid pressure generators based on the output of a pedal stroke sensor. Therefore, the brake fluid pressure generated by the master cylinder is prevented from being transmitted to wheel cylinders, even when a shutoff valve, which closes during normal operation of a conventional BBW type brake system, is not provided, thereby providing reliable operation of the BBW type brake system. Thus, since the master cylinder and the fluid pressure generators are kept in communication at a non-braking time, a reservoir of the master cylinder can be also used as the reservoir of the fluid pressure generators without providing the system with an atmosphere valve, which is conventionally required.

10 Claims, 6 Drawing Sheets

ABNORMAL OPERATION

FIG.2 ABNORMAL OPERATION

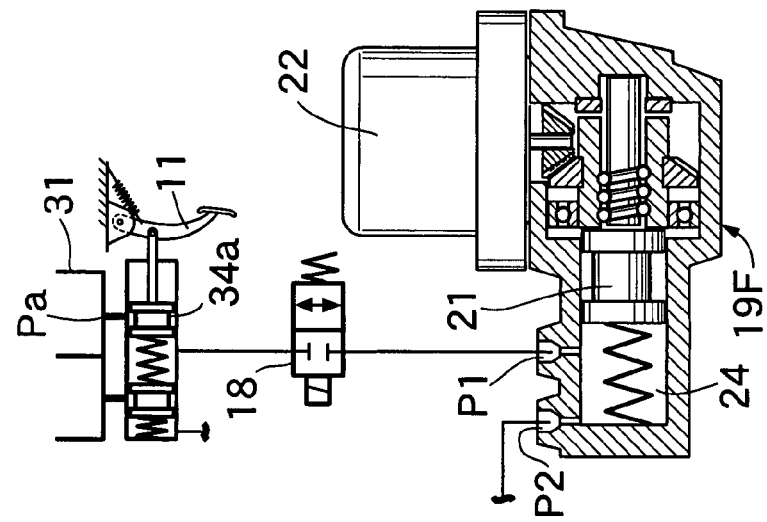
FIG.4A NON-OPERATION
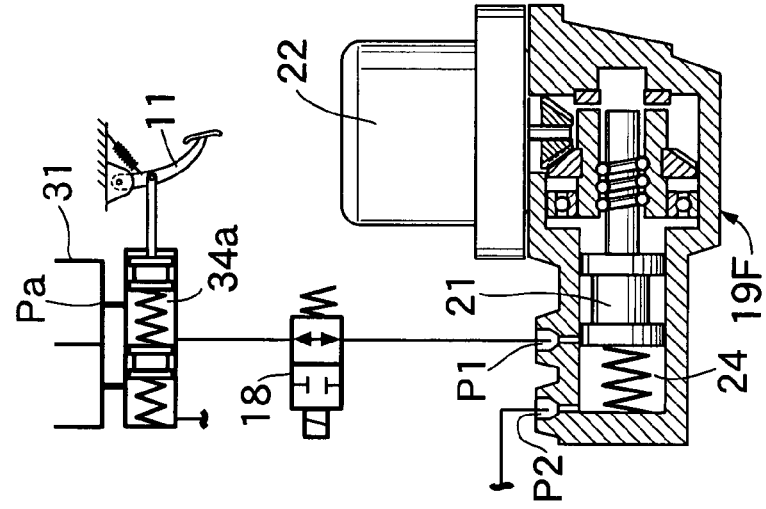
FIG.4B INITIAL OPERATION
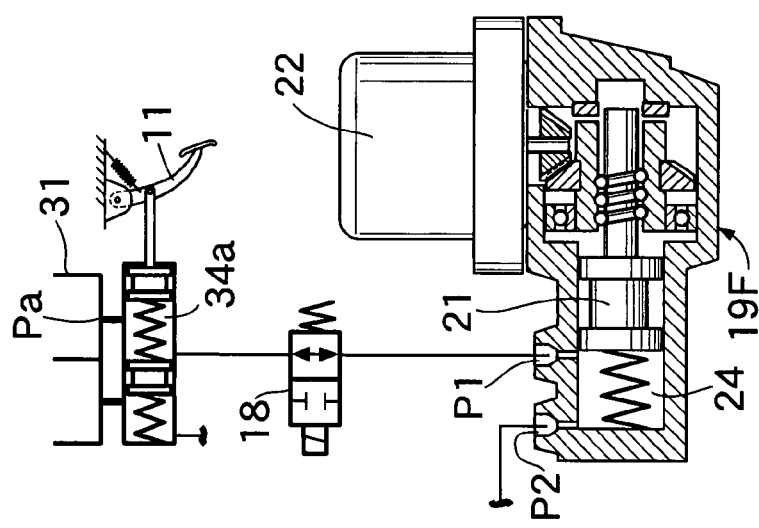
FIG.4C ABS OPERATION

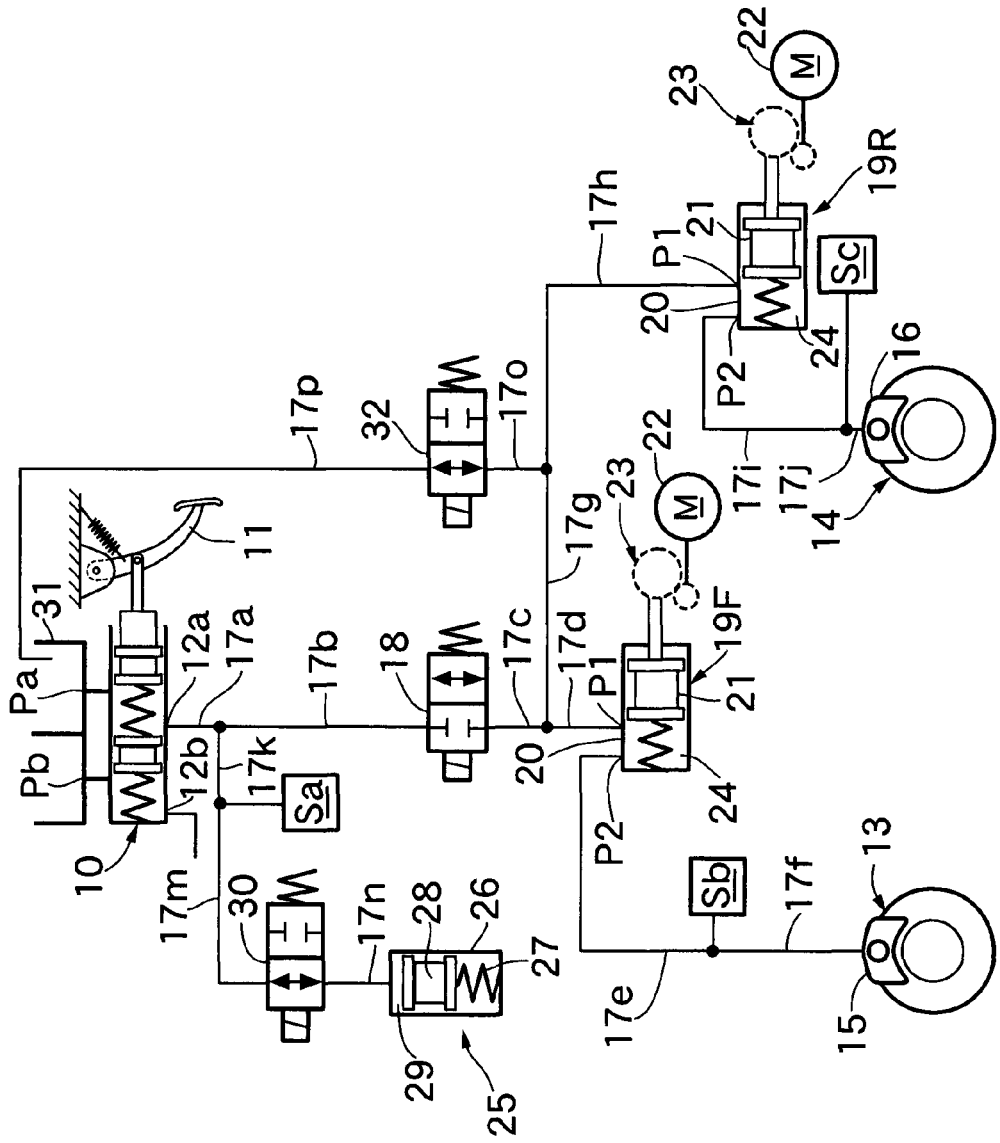

ABNORMAL OPERATION
PRIOR ART

BRAKE SYSTEM

CROSS-REFERENCE TO RELATED APPLICATIONS

The present invention claims priority under 35 USC 119 based on Japanese patent application No. 2006-056163, filed on Mar. 2, 2006. The entirety of the subject matter of this priority document is incorporated by reference herein.

BACKGROUND OF THE INVENTION

1. Field of the Invention

The present invention relates to a brake by wire (BBW) system which electrically operates a fluid pressure generator using an electrical signal which is outputted in response to a brake operation of a driver. The brake system operates a wheel cylinder using brake fluid pressure generated by the fluid pressure generator in order to brake a wheel.

2. Description of the Related Art

Japanese Patent Application Laid-open No. 2000-127805 discloses a so-called BBW type brake system which normally operates a hydraulic brake using brake fluid pressure generated by a power fluid pressure source when communication between a master cylinder that generates brake fluid pressure by a driver depressing a brake pedal and a hydraulic brake (wheel cylinder) that brakes a wheel is shut off by means of a master cylinder cut valve (shutoff valve). During such normal operation the power fluid pressure source (fluid pressure generator) that generates brake fluid pressure is operable. The brake system opens the master cylinder cut valve to operate the hydraulic brake with the brake fluid pressure generated by the master cylinder during abnormal operation, having previously absorbed the brake fluid pressure generated by the master cylinder during the above described normal operation using a stroke simulator. The stroke simulator enables a stroke of the brake pedal during abnormal operation when the power fluid pressure source becomes inoperable.

If the conventional BBW type brake system has a power fluid pressure source comprising a fluid pressure generator which generates brake fluid pressure by driving a piston using an electric motor in such a BBW type brake system, the fluid pressure generator and a reservoir of the fluid pressure generator are allowed to communicate with each other by a special fluid passage. The reservoir of the master cylinder is also used as the reservoir of the fluid pressure generator. In this structure, when the fluid pressure generator fails, a master cylinder cut valve is opened, and the wheel cylinder is operated with the brake fluid pressure generated by the master cylinder. Therefore, an atmosphere valve provided in the special fluid passage is required to be closed in order to prevent the brake fluid pressure generated by the master cylinder from escaping to the reservoir through the special fluid passage.

However, if the atmosphere valve is employed in the brake system, the number of components and cost correspondingly increase, and therefore it is desirable to eliminate the atmosphere valve while maintaining the function of the BBW type brake system.

SUMMARY OF THE INVENTION

The present invention has been achieved in view of the above described circumstances, and has as an object to make it possible to eliminate use of an atmosphere valve in a BBW type brake system, and thereby reduce the number of components and cost in the brake system.

In order to achieve a solution to the above problem, according to a first feature of the present invention, there is provided a brake system, comprising: a master cylinder which generates brake fluid pressure by a brake operation of a driver; a reservoir which is connected to the master cylinder; a wheel cylinder which brakes a wheel; a fluid pressure generator which has a first port which communicates with the master cylinder and a second port which communicates with the wheel cylinder, and which generates brake fluid pressure by means of an electrically operated piston; and brake operation detecting means which detects the brake operation of the driver. According to the first aspect of the invention, an operation of the fluid pressure generator is initiated based on a brake operation detection signal of the brake operation detecting means.

With this arrangement, the fluid pressure generator starts operation based on the brake operation of the driver detected by the brake operation detecting means, and therefore the first port of the fluid pressure generator is closed to generate brake fluid pressure before the master cylinder generates brake fluid pressure. Further, even if the shutoff valve between the master cylinder and the fluid pressure generator is not provided, the brake fluid pressure generated by the master cylinder is prevented from being transmitted to the wheel cylinder to reliably operate the BBW type brake system. Therefore, the reservoir of the master cylinder and the fluid pressure generator are maintained in a communicating state at a non-braking time. Thus, the reservoir of the master cylinder can be also used as the reservoir of the fluid pressure generator, without providing a special fluid passage in which a conventionally required atmosphere valve is provided, and the number of components and cost can be reduced by eliminating the atmosphere valve.

According to a second feature of the present invention, in addition to the first feature, the shutoff valve is closed when the piston of the fluid pressure generator retreats to reduce the brake fluid pressure of the wheel cylinder.

With this arrangement, even if the first port of the fluid pressure generator is opened by the piston when the piston of the fluid pressure generator retreats to reduce the brake fluid pressure of the wheel cylinder following the operation of the ABS, the closed shutoff valve shuts off communication of the first port with the master cylinder, and therefore pressure reduction of the brake fluid pressure of the wheel cylinder can be effectively performed.

According to a third feature of the present invention, in addition to the first or second feature, the piston of the fluid pressure generator closes the first port before the piston of the master cylinder closes a refilling port connected to the reservoir.

With this arrangement, the first port of the fluid pressure generator is closed before the refilling port of the master cylinder is closed, and therefore the brake fluid pressure can be reliably generated in the fluid pressure generator before the master cylinder generates the brake fluid pressure.

A pedal stroke sensor Sd of an embodiment corresponds to the brake operation detecting means of the present invention.

The above-mentioned object, other objects, characteristics, and advantages of the present invention will become apparent from a preferred embodiment, which will be described in detail below by reference to the attached drawings.

BRIEF DESCRIPTION OF THE DRAWINGS

FIG. 4A is an explanatory view of the configuration of the brake system of FIG. 1 during a period of non-operation.

FIG. 4B is an explanatory view of the configuration of the brake system of FIG. 1 during an initial period of operation.

FIG. 4C is an explanatory view of the configuration of the brake system of FIG. 1 during a period of ABS operation.

FIG. 5 is a prior art fluid pressure system diagram of a brake system for a vehicle during normal operation.

DESCRIPTION OF THE PRESENT EMBODIMENT

Figure 1:
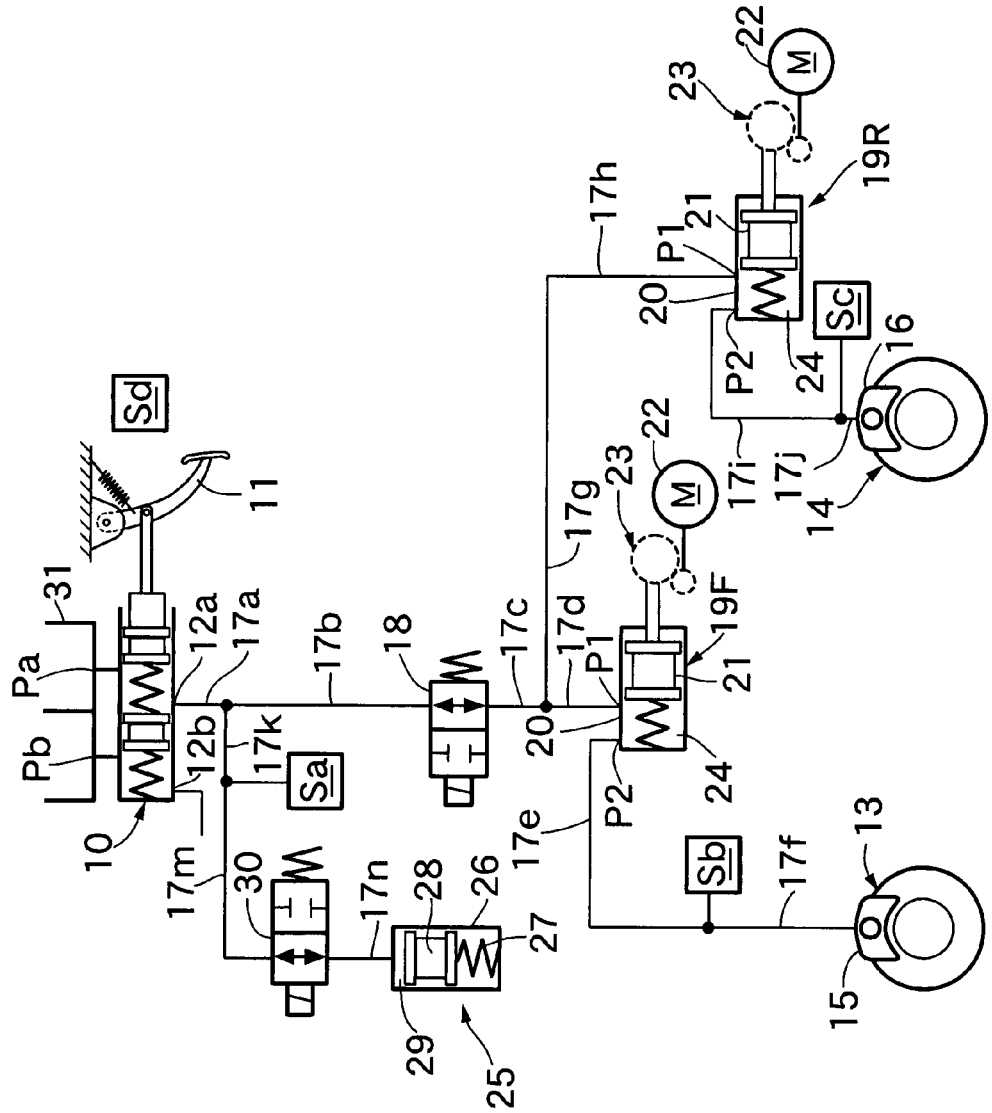
FIG. 1 is a fluid pressure system diagram of a brake system for a vehicle according to the present invention during normal operation of the brake system.

As shown in FIG. 1, a tandem type master cylinder 10 includes first and second output ports 12a and 12b which output brake fluid pressure corresponding to the force with which a driver depresses a brake pedal 11. The first output port 12a is connected to disc brake devices 13 and 14 of a left front wheel and a right rear wheel, for example, and the second output port 12b is connected to disc brake devices at a right front wheel and a left rear wheel (not shown), for example. FIG. 1 shows only the brake system which connects to the first output port 12a, and does not show the other brake system which connects to the second output port 12b, since the structures of both brake systems are substantially the same. The brake system which connects to the first output port 12a will be described below.

The first output port 12a of the master cylinder 10 and a wheel cylinder 15 of the disc brake device 13 of the front wheel are connected with fluid passages 17a to 17f. Fluid passages 17g to 17j which branch from between the fluid passages 17c and 17d are connected to a wheel cylinder 16 of the disc brake device 14 at the rear wheel.

A shutoff valve 18, which is a normally open type electromagnetic valve, is disposed between the fluid passages 17b and 17c. A fluid pressure generator 19F, which is capable of generating fluid pressure on the front wheel, is disposed between the fluid passages 17d and 17e. The fluid pressure generator 19F includes a cylinder 20 disposed between the fluid passages 17d and 17e. A piston 21, which is slidably fitted in the cylinder 20, is driven by an electric motor 22 via a speed reducing mechanism 23, and can generate brake fluid pressure in a fluid chamber 24 formed on the front surface of the piston 21.

Similarly, a fluid pressure generator 19R, which is capable of generating fluid pressure on the rear wheel, is disposed between the fluid passages 17h and 17i. The fluid pressure generator 19R includes the cylinder 20 disposed between the fluid passages 17h and 17i. The piston 21, which is slidably fitted in the cylinder 20, is driven by the electric motor 22 via the speed reducing mechanism 23, and can generate brake fluid pressure in the fluid chamber 24 formed on the front surface of the piston 21.

A stroke simulator 25 is connected to a downstream end of fluid passages 17k to 17n, which branch from between the fluid passages 17a and 17b. The stroke simulator 25 is formed by slidably fitting a piston 28, which is biased by a spring 27, in a cylinder 26. A fluid chamber 29, which is formed at a side opposite from the spring 27 of the piston 28, communicates with the fluid passage 17n. A reaction force permission valve 30, which is a normally closed type electromagnetic valve, is disposed between the fluid passages 17m and 17n.

A fluid pressure sensor Sa, which detects the brake fluid pressure generated by the master cylinder 10, a fluid pressure sensor Sb, which detects the brake fluid pressure transmitted to the disc brake device 13 of the front wheel, a fluid pressure sensor Sc, which detects the brake fluid pressure transmitted to the disc brake device 14 of the rear wheel, and a pedal stroke sensor Sd, which detects a stroke of the brake pedal, are connected to an unillustrated BBW electronic control unit which controls the shutoff valve 18, the reaction force permission valve 30, and the electric motors 22 and 22 of the fluid pressure generators 19F and 19R.

Figure 3:
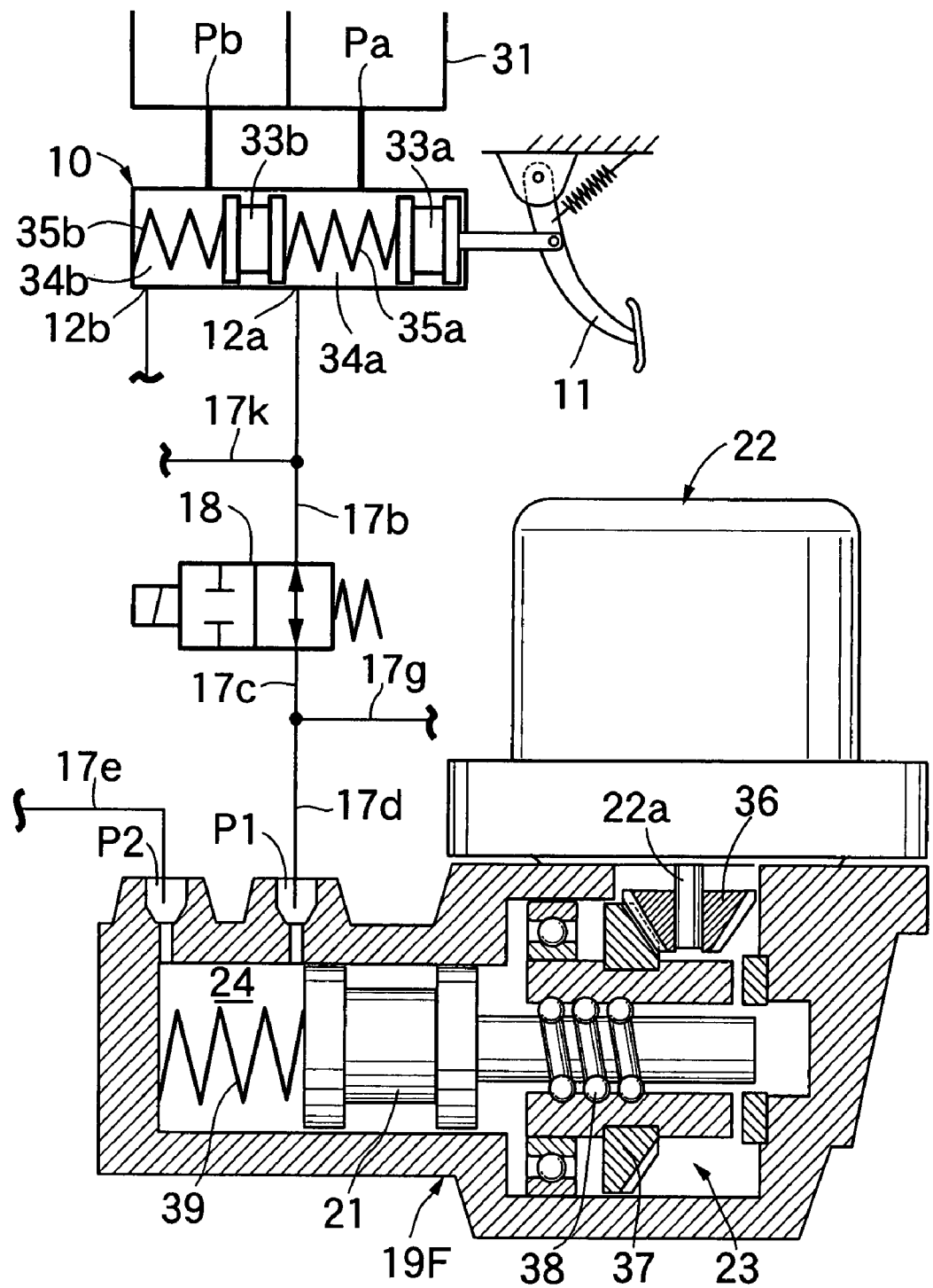
FIG. 3 is an enlarged view of a master cylinder and a fluid pressure generator.

As shown in FIG. 3, the master cylinder 10 includes a pair of pistons 33a and 33b, liquid chambers 34a and 34b which are formed on their respective front surfaces, and return springs 35a and 35b, which are disposed in the fluid chambers 34a and 34b. The fluid chamber 34a, which connects to the first output port 12a of the brake system, communicates with a reservoir 31 via a refilling port Pa. The fluid chamber 34b, which connects to the second output port 12b of the other brake system, communicates with the reservoir 31 via a refilling port Pb. When the brake pedal 11 is depressed, the piston 33a advances and passes the refilling port Pa, and brake fluid pressure is generated in the fluid chamber 34a. When the piston 33b advances and passes the refilling port Pb, brake fluid pressure is generated in the fluid chamber 34b.

A speed reducer 23 of the fluid pressure generator 19F includes a driven bevel gear 36 provided at an output shaft 22a of the electric motor 22, a follower bevel gear 37, which is meshed with the driven bevel gear 36, and a ball screw mechanism 38 which is operated by the follower bevel gear 37. When the electric motor 22 is driven in one direction, the piston 21 advances, and when it is driven in the reverse direction, the piston 21 retreats. A first port P1, which communicates with the fluid passage 17d, and a second port P2, which communicates with the fluid passage 17e, open to the fluid chamber 24 in which a return spring 39 is disposed. When the piston 21 advances and passes the first port P1, brake fluid pressure is generated in the fluid chamber 24.

In order to clarify the characteristics of the BBW type brake system of the embodiment of the present invention having the above described construction, the structure of the conventional BBW type brake system will be described based on FIGS. 5 and 6.

As is obvious by comparison between FIG. 5 and FIG. 1, in the conventional BBW type brake system, the fluid passages 17o and 17p, which branch from between the fluid passages 17g' and 17h' communicate with the reservoir 31' of the master cylinder 10', and an atmosphere valve 32, which is a normally closed type electromagnetic valve, is disposed between the fluid passages 17o and 17p. The conventional BBW type brake system does not require the pedal stroke sensor Sd of the BBW type brake system of this embodiment. The other components of the conventional BBW type brake system are the same as those of the BBW type brake system of this embodiment, and are identified in the figures using the same reference numbers along with a prime (') identifier.

Next, an operation of the conventional BBW type brake system will be described.

During normal operation as shown in FIG. 5, the solenoids of the shutoff valve 18', the reaction force permission valve 30' and the atmosphere valve 32 are excited by the command from the unillustrated BBW electronic control unit. The shutoff valve 18' is closed to shut off communication between the master cylinder 10' and the disc brake devices 13' and 14', and the reaction force permission valve 30' is opened to provide communication between the master cylinder 10' and the stroke simulator 25'. In addition, the atmosphere valve 32 is opened. When the driver depresses the brake pedal 11' in this state and the master cylinder 10' generates brake fluid pressure, the fluid pressure sensor Sa' detects the brake fluid pressure of the fluid passage 17k' closed by the shutoff valve 18'. The BBW electronic control unit operates the fluid pressure generators 19F' and 19R' of the front wheel and the rear wheel, thereby providing fluid pressure within the fluid passages 17f' and 17j' corresponding to the brake fluid pressure detected by the fluid pressure sensor Sa'.

As a result, the drive force of the electric motor 22' of the fluid pressure generator 19F' of the front wheel is transmitted to the piston 21' via the speed reducing mechanism 23', and the brake fluid pressure generated in the fluid chamber 24' of the cylinder 20' is transmitted to the wheel cylinder 15' of the disc brake device 13' through the fluid passages 17e' and 17f', thereby braking the front wheel. At this time, the brake fluid pressure of the fluid passage 17f is detected by the fluid pressure sensor Sb', and the operation of the electric motor 22' is feedback-controlled so that the brake fluid pressure changes corresponding to the brake fluid pressure detected by the fluid pressure sensor Sa' of the fluid passage 17k'.

Similarly, the drive force of the electric motor 22' of the fluid pressure generator 19R' of the rear wheel is transmitted to the piston 21' via the speed reducing mechanism 23', and the brake fluid pressure generated in the fluid chamber 24' of the cylinder 20' is transmitted to the wheel cylinder 16' of the disc brake device 14' through the fluid passages 17i' and 17j', thereby braking the rear wheel. At this time, the brake fluid pressure of the fluid passage 17j is detected by the fluid pressure sensor Sc', and the operation of the electric motor 22' is feedback-controlled so that the brake fluid pressure changes corresponding to the brake fluid pressure detected by the fluid pressure sensor Sa' of the fluid passage 17k'.

When the piston 21' in the cylinder 20' slightly advances via actuation by the electric motor 22', a first port P1' is closed to cut communication between the fluid chamber 24' and the fluid passage 17d' (or the fluid passage 17h'), and therefore there is no fear that brake fluid pressure generated by the cylinder 20' escapes to the reservoir 31' via the atmosphere valve 32 provided between the fluid passages 17o and 17p.

During the above described normal operation, the shutoff valve 18' is kept in the closed state unless an abnormal condition occurs, such as a failure of the power supply. Therefore, in the conventional brake system, there is a possibility of a problem that if the brake pads of the disc brake devices 13' and 14' wear, and the volume of the fluid passages 17e' and 17f' or the volume of the fluid passages 17i' and 17j' between the cylinders 20' and 20' and the disc brake device 13' and 14' increase, then the brake fluid corresponding to this amount cannot be supplied from the reservoir 31' and the drag of the wheel cylinders 15' and 16' cannot be reduced.

However, when the pistons 21' and 21' retreat in the cylinders 20' and 20', the fluid chambers 24' and 24' communicate with the reservoir 31' via the opened atmosphere valve 32. Therefore, the brake fluid, which becomes insufficient due to wear of the brake pads of the disc brake devices 13' and 14', can be replenished from the reservoir 31', and the drag of the wheel cylinders 15' and 16' at the time of release of the braking force can be reduced.

When the driver depresses the brake pedal 11', and the master cylinder 10' generates the brake fluid pressure during normal operation, the brake fluid pressure is transmitted to the fluid chamber 29' of the stroke simulator 25', and the piston 28' moves against the elastic force of the spring 27', thereby generating the reaction force to depression of the brake pedal 11'. Therefore, though the disc brake devices 13' and 14' are actually operated by the drive force of the electric motors 22' and 22', the driver can obtain an operation feeling which is equivalent to that obtained when operating the disc brake devices 13' and 14' by the stepping force of the driver.

Figure 6:
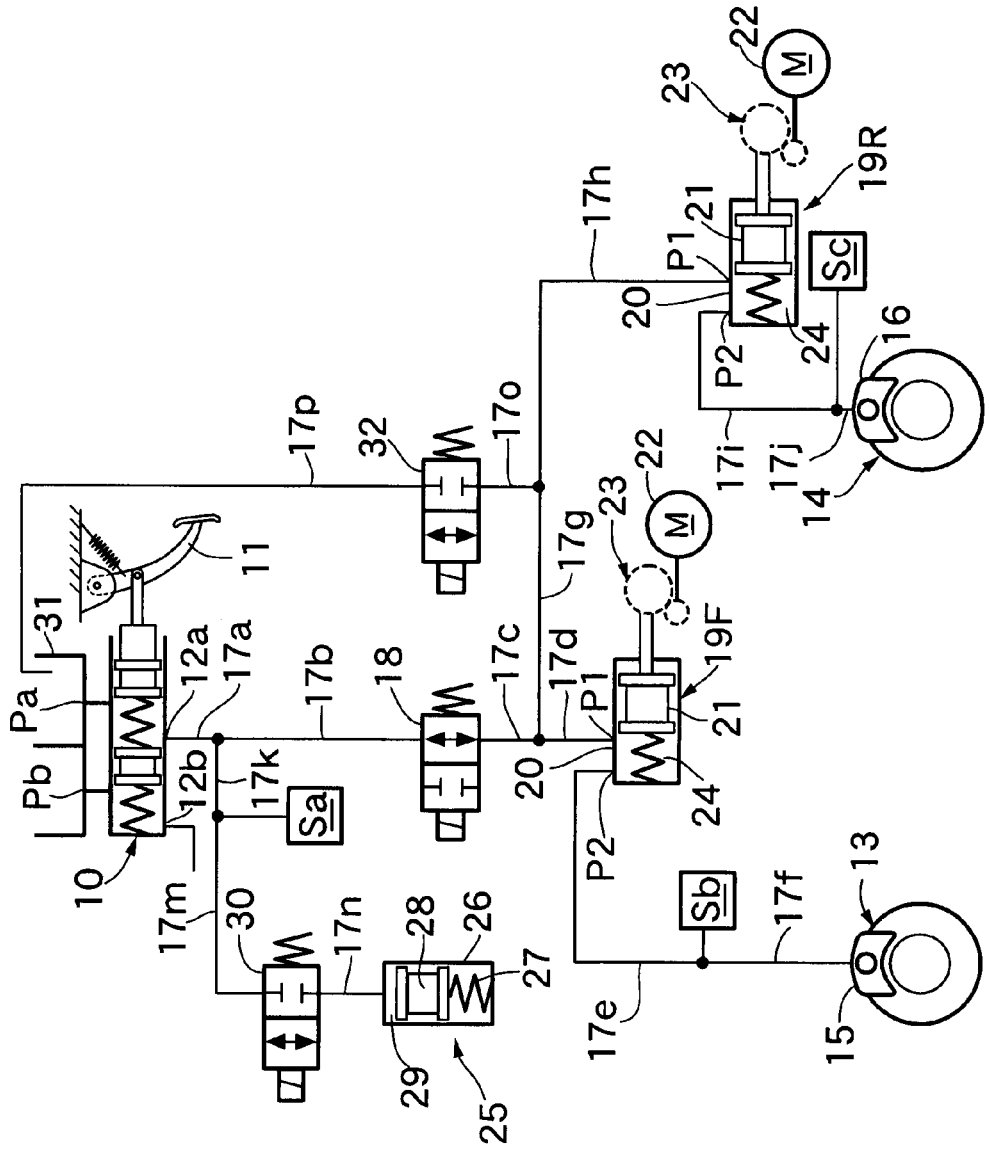
FIG. 6 is a prior art fluid pressure system diagram corresponding to the brake system of FIG. 5 during abnormal operation.

On the other hand, during abnormal operation, such as a power failure due to removal of the battery or the like, the shutoff valve 18' opens to provide communication between the master cylinder 10' and the disc brake devices 13' and 14' as shown in FIG. 6. In addition, the reaction force permission valve 30' closes to shut off communication between the master cylinder 10' and the stroke simulator 25', and the atmosphere valve 32 closes to shut off communication between the master cylinder 10' and the reservoir 31'. As a result, the brake fluid pressure, which is generated in the master cylinder 10' by the driver depressing the brake pedal 11', is transmitted to the wheel cylinder 15' of the disc brake device 13' of the front wheel via the opened shutoff valve 18' and the fluid pressure generator 19F'; and is transmitted to the wheel cylinder 16' of the disc brake device 14' of the rear wheel via the opened shutoff valve 18' and the fluid pressure generator 19R', in order to brake the front wheel and the rear wheel.

At the same time, communication between the stroke simulator 25' and the master cylinder 10' is shut off by closing the reaction force permission valve 30', and therefore the stroke simulator 25' stops its function. As a result, the stroke of the brake pedal 11' can be prevented from unnecessarily increasing to give an uncomfortable feeling to the driver. In addition, the brake fluid pressure generated by the master cylinder 10' is transmitted to the wheel cylinders 15' and 16' without being absorbed by the stroke simulator 25', thereby generating a braking force with a high responsiveness.

Thus, even if the power supply fails and the shutoff valve 18', the reaction force permission valve 30', the atmosphere valve 32 and the fluid pressure generators 19F' and 19R' become inoperable, the wheel cylinders 15' and 16' of the front wheel and the rear wheel can be operated without any problem with the brake fluid pressure generated in the master cylinder 10' by the driver depressing the brake pedal 11', thereby braking the front wheel and the rear wheel to more safely stop the vehicle during abnormal operation.

Figure 2:
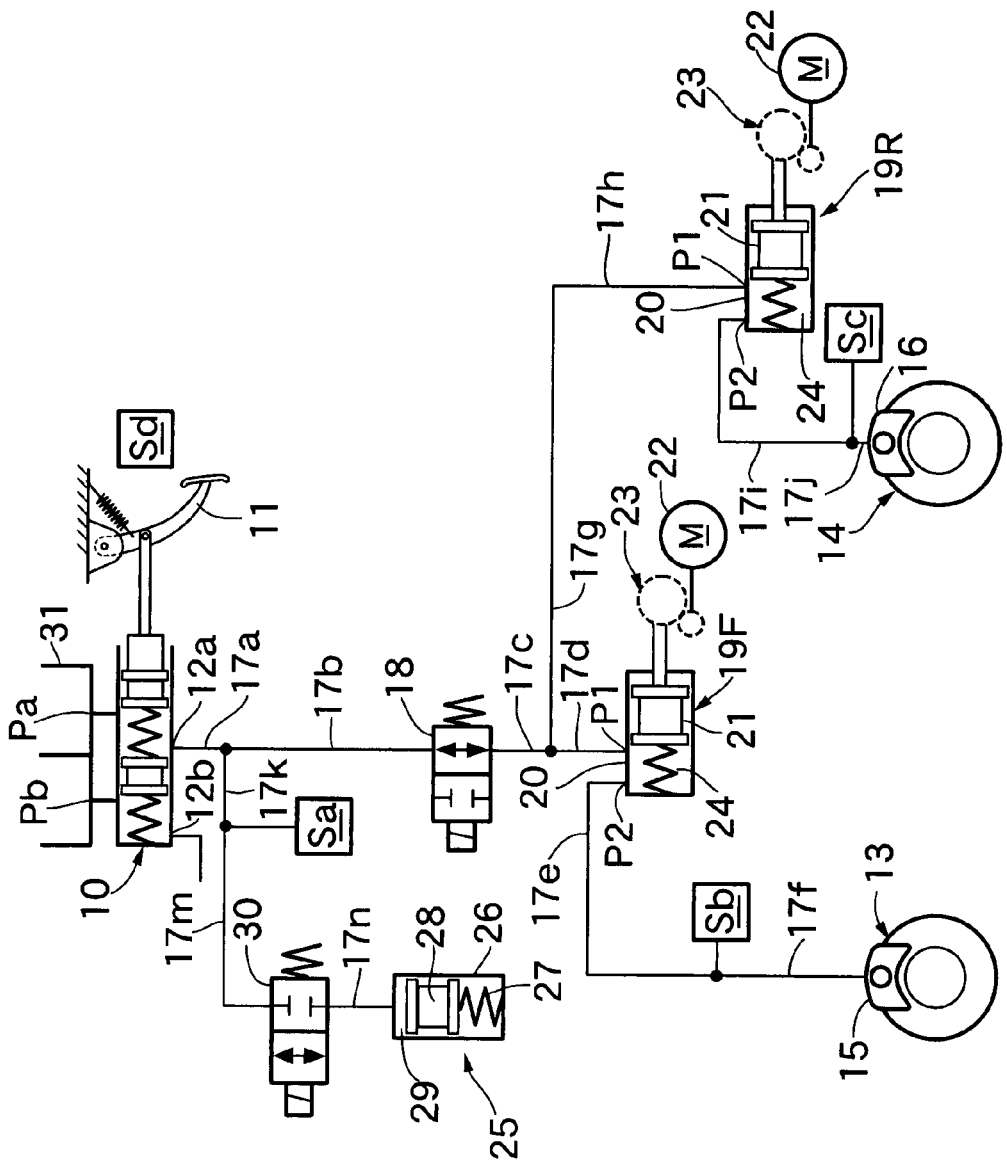
FIG. 2 is a fluid pressure system diagram corresponding to FIG. 1 during abnormal operation of the brake system.

Next, an operation of the inventive BBW type brake system of FIGS. 1 and 2 will be described by contrasting it with the operation of the conventional BBW type brake system which is described in FIGS. 5 and 6.

The shutoff valve 18' of the conventional BBW type brake system is closed during normal operation and is opened during abnormal operational. However, the shutoff valve 18 of the inventive BBW type brake system of this embodiment is kept in an opened state during normal operation as shown in FIG. 1, and also during abnormal operation as shown in FIG. 2, except in a time of an ABS operation which will be described later. Accordingly, during a period of non-braking (see FIG. 4A) in which the master cylinder 10 and the fluid pressure generators 19F and 19R do not operate, the first ports P1 and P1 of the fluid pressure generators 19F and 19R communicate with the reservoir 31 via the shutoff valve 18 which is opened, the fluid chamber 34a of the master cylinder 10 and the supply port Pa of the master cylinder 10. Therefore, the reservoir 31 of the master cylinder 10 can be also used as the reservoir of the fluid pressure generators 19F and 19R. In addition, the fluid passages 17o' and 17p' (see FIG. 5 and FIG.

6), which are required by the conventional BBW type brake system are, not required in the inventive BBW type brake system.

In the conventional BBW type brake system, the master cylinder 10' generates brake fluid pressure, and thereafter, the fluid pressure generators 19F' and 19R' operate to generate a brake fluid pressure corresponding to the brake fluid pressure. However, in the inventive BBW type brake system of this embodiment, as soon as the pedal stroke sensor Sd detects that a driver depresses the brake pedal 11, the fluid pressure generators 19F and 19R are operated. Accordingly, before the piston 33a of the master cylinder 10 passes the refilling port Pa, and brake fluid pressure is generated in the fluid chamber 34a, the pistons 21 of the fluid pressure generators 19F and 19R pass the first port P1, and brake fluid pressure is generated in the fluid chamber 24 (see FIG. 4B). Therefore, the conventional BBW type brake system needs to open the shutoff valve 18' during normal operation to inhibit the brake fluid pressure generated in the master cylinder 10' from being transmitted to the wheel cylinders 15' and 16'.

However, in the inventive BBW type brake system of this embodiment, even if the shutoff valve 18 is not closed and kept in the opened state during normal operation as shown in FIG. 1, the respective first ports P1 and P1 of the fluid pressure generators 19F and 19R are closed before the master cylinder 10 generates brake fluid pressure, and therefore the brake fluid pressure generated by the master cylinder 10 is not transmitted to the wheel cylinders 15 and 16.

In the conventional BBW type brake system, the shutoff valve 18' opens during abnormal operation as shown in FIG. 6. Therefore, unless the atmosphere valve 32 is closed, the brake fluid pressure generated by the master cylinder 10' escapes to the reservoir 31' and the wheel cylinders 15' and 16' cannot be operated. On the other hand, the inventive BBW type brake system of this embodiment does not have the fluid passages 17o' and 17p', which permit the fluid pressure generators 19F' and 19R' and the reservoir 31' to communicate with each other. Therefore, the atmosphere valve 32, which closes the fluid passages 17o' and 17p' during abnormal operation, is not required, thereby reducing the number of components and simplifying the structure.

The shutoff valve 18 of the inventive BBW type brake system of this embodiment is kept in the opened state both during normal operation and during abnormal operation, but is only closed during operation of an anti-lock braking system (ABS) as shown in FIG. 4C. The reason is as follows. At the time of operation of the ABS, the pistons 21 and 21 of the fluid pressure generators 19F and 19R repeatedly retreat, stop and advance to thereby reduce, keep and increase the brake fluid pressure of the wheel cylinders 15 and 16 and suppress locking of the wheels. If the shutoff valve 18 opens at this time, the fluid chambers 24 and 24 are permitted to communicate with the master cylinder 10 and the stroke simulator 25, thus causing a problem that sufficient pressure reduction cannot be performed even when the piston 21 and 21 retreat past the first ports P1 and P1.

However, if the shutoff valve 18 is closed at the time of operation of the ABS as shown in FIG. 4C, pressure reduction corresponding to the amount of retreat of the pistons 21 and 21 can be generated in the fluid chambers 24 and 24, even when the pistons 21 and 21 retreat past the first ports P1 and P1, thereby permitting performance of ABS control without any problem.

The embodiment of the present invention has been described above, but various changes in design can be made without departing from the subject matter of the present invention.

For example, the fluid pressure circuit of the embodiment includes the shutoff valve 18, but if the ABS control is not performed, the number of components and cost can be further reduced by eliminating the shutoff valve 18.

What is claimed is:

1. A brake system, comprising:
  a master cylinder which generates brake fluid pressure based on a brake operation of a driver;
  a reservoir which is fluidly connected to the master cylinder;
  a wheel cylinder which brakes a wheel;
  a pedal stroke sensor which is operable to detect the brake operation of the driver;
  a fluid pressure generator, the fluid pressure generator comprising:
    a generator cylinder;
    a first port which communicates with the master cylinder;
    a second port which communicates with the wheel cylinder; and
    an electrically operated piston disposed in the generator cylinder which generates brake fluid pressure;
  a normally open shutoff valve disposed between the master cylinder and the fluid pressure generator;
  a first fluid passage extending between the master cylinder and the shutoff valve; and
  a second fluid passage extending between the shutoff valve and the fluid pressure generator;
  wherein said first and second fluid passages cooperate to provide an exclusive channel of fluid communication between the reservoir and the fluid pressure generator;
  wherein an operation of the fluid pressure generator is started based on a brake operation detection signal of the pedal stroke sensor, and
  wherein the piston of the fluid pressure generator closes the first port before a piston of the master cylinder closes a refilling port connected to the reservoir.

2. The brake system according to claim 1, wherein the shutoff valve is closed when the piston of the fluid pressure generator retreats to reduce the brake fluid pressure of the wheel cylinder.

3. The brake system according to claim 1, wherein
  the shutoff valve is provided in an open configuration during both normal and abnormal braking operations except during anti-lock braking operations.

4. The brake system according to claim 1, wherein during a period of non-operation of the brake system, the first port of the fluid pressure generator communicates with the reservoir via the shut-off valve, which is in an open position.

5. A brake system, comprising:
  a master cylinder which generates brake fluid pressure based on a brake operation of a driver;
  a reservoir which is connected to the master cylinder;
  a wheel cylinder which brakes a wheel;
  a brake operation detecting device which detects the brake operation of the driver; and
  a fluid pressure generator, the fluid pressure generator comprising:
    a generator cylinder;
    a first port formed in the generator cylinder which communicates with the master cylinder;
    a second port formed in the generator cylinder which communicates with the wheel cylinder; and
    a piston disposed in the generator cylinder, the piston generating a brake fluid pressure;
  a shutoff valve disposed between the master cylinder and the fluid pressure generator;

a first fluid passage extending between the master cylinder and the shutoff valve; and a second fluid passage extending between the shutoff valve and the fluid pressure generator;

wherein said first and second fluid passages cooperate to provide an exclusive channel of fluid communication between the reservoir and the fluid pressure generator;

wherein operation of the fluid pressure generator is started based on a brake operation detection signal of the brake operation detecting device, and wherein the piston of the fluid pressure generator closes the first port before a piston of the master cylinder closes a refilling port connected to the reservoir.

6. The brake system according to claim 5, wherein the generator cylinder further comprises a fluid chamber, the fluid chamber located between the piston and an end of the generator cylinder, and wherein the first port is disposed on the generator cylinder at a location spaced from the end of the generator cylinder, and the second port is disposed on the generator cylinder between the first port and the end of the generator cylinder.

7. The brake system according to claim 6, wherein:

when no braking operation is provided, the shutoff valve is in an open position, and the piston is positioned at a first position within the generator cylinder adjacent to the first port such that both the first port and the second port communicate with the fluid chamber, and when a braking operation is detected, the shutoff valve remains in the open position, and the piston is positioned in an advanced position relative to the first position such that the first port is prevented from communicating with the fluid chamber and the second port communicates with the fluid chamber.

8. The braking system according to claim 7, wherein when an anti-lock braking operation is detected, the shutoff valve is in a closed position, and the piston is movable within the generator cylinder between the first position, the advanced position, and a retracted position, the retracted position located such that both the first port and the second port communicate with the fluid chamber, and such that a volume of the fluid chamber is increased relative to that of the first position.

9. The brake system according to claim 5, wherein the brake operation detecting device is a pedal stroke sensor, and the fluid pressure generator is operated after the pedal stroke sensor detects depression of a brake pedal.

10. The brake system according to claim 5, wherein the first port of the fluid pressure generator is closed before the master cylinder generates brake fluid pressure, and brake fluid pressure generated by the master cylinder is not transmitted to the wheel cylinder.

* * * * *